(No Model.)
I. Y. PALMER.
SEED PLANTER.
No. 504,848. Patented Sept. 12, 1893.
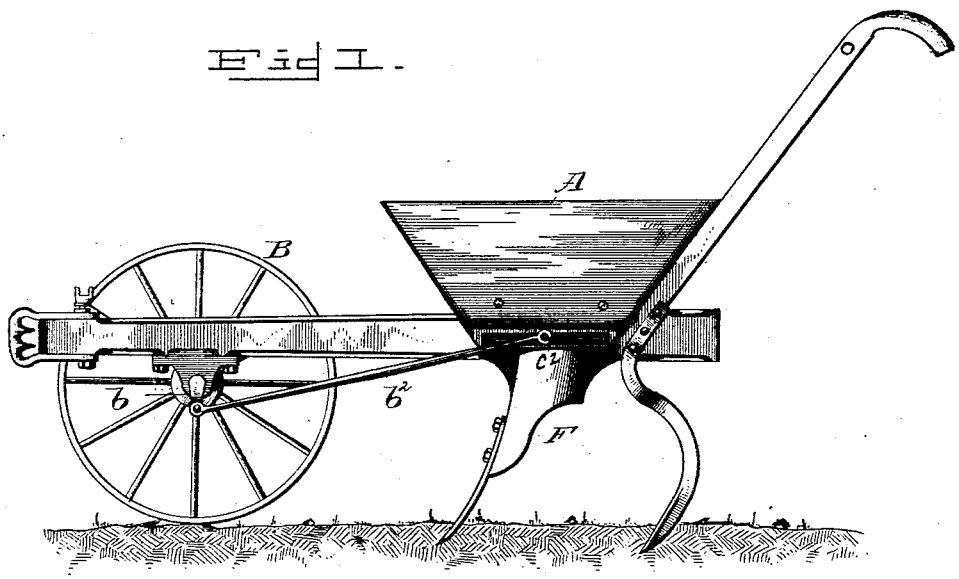
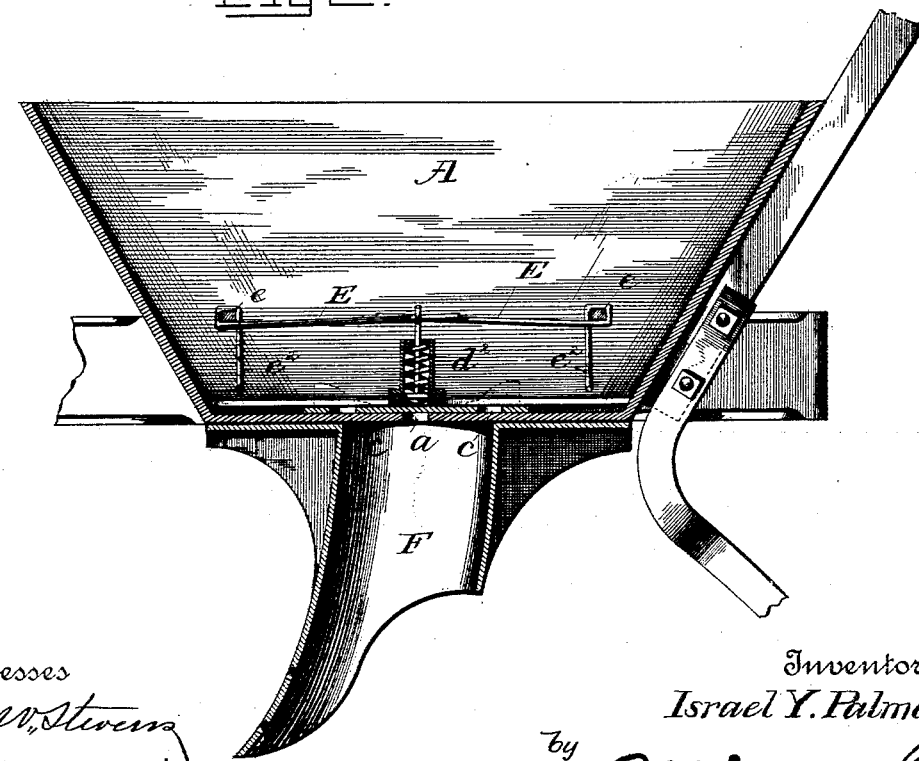
Witnesses
Paul W. Stevens
David H. Mead
Inventor:
Israel Y. Palmer,
by R. S. Dyrenforth,
his Attorney.

(No Model.)  2 Sheets—Sheet 2.
I. Y. PALMER.
SEED PLANTER.

No. 504,848. Patented Sept. 12, 1893.

Witnesses
Paul W. Stevens
David H. Mead

Inventor:
Israel Y. Palmer;
by R. S. Dyrenforth,
his Attorney.

UNITED STATES PATENT OFFICE.

ISRAEL Y. PALMER, OF COLUMBIA, ALABAMA, ASSIGNOR OF TWO-THIRDS TO GEORGE L. CAMPBELL AND BARTON HOOTEN, OF SAME PLACE.

SEED-PLANTER.

SPECIFICATION forming part of Letters Patent No. 504,848, dated September 12, 1893.

Application filed November 28, 1892. Serial No. 453,439. (No model.)

*To all whom it may concern:*

Be it known that I, ISRAEL Y. PALMER, a citizen of the United States, residing at Columbia, in the county of Henry and State of Alabama, have invented certain new and useful Improvements in Seed-Planters; and I do hereby declare the following to be a full, clear, and exact description of the invention, such as will enable others skilled in the art to which it appertains to make and use the same.

This invention relates to planters.

The object of the invention is to produce a planter which shall be simple, efficient, and durable, and one which shall be automatic and absolutely certain in its operation, and whereby, also, a predetermined quantity of seed may be accurately deposited.

With these objects in view, the invention consists essentially in a planter, comprising a hopper, having a discharge-opening, a slide having receptacles and capable of reciprocating to bring the receptacles in line with the discharge-opening, and a reciprocating-plunger arranged above the discharge-opening.

The invention furthermore, consists in a planter, comprising a hopper having receptacles therein, and having abutments thereon, a plunger arranged above the discharge-opening, and pivoted levers bearing on the plunger, and arranged in the path of movement of the abutments on the slide.

The invention furthermore, resides in various novel combinations of parts, whereby the objects of the invention are attained.

The invention is illustrated in the accompanying drawings, in which—

Figure 3:
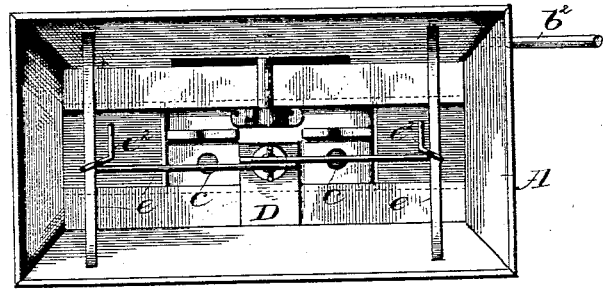
Figure 4:
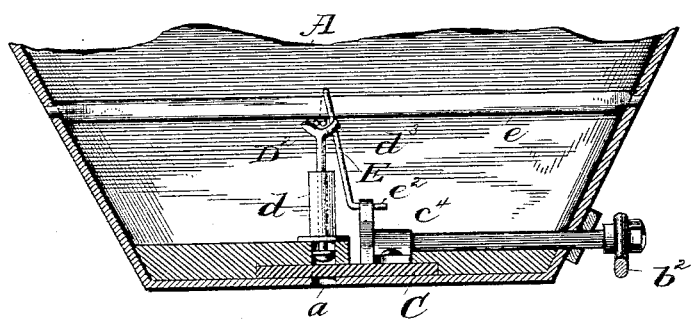
Figure 5:
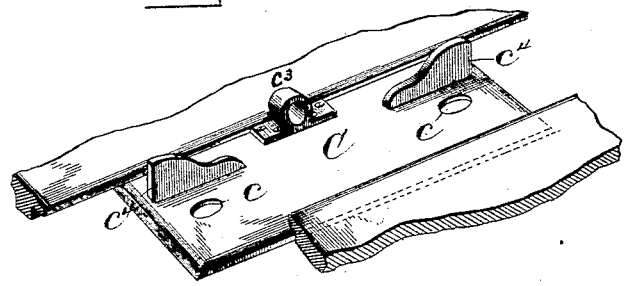

Figure 1— represents a planter having my improvement combined therewith. Fig. 2— is a sectional view of the hopper, the same being shown on a larger scale than in Fig. 1. Fig. 3— is a plan view of the hopper. Fig. 4— is a section of the hopper, the section being taken at right angles to that shown in Fig. 2; and Fig. 5— is a perspective view, showing the slide, and its guideways removed from the rest of the hopper.

In the drawings, A represents a hopper of a planter, which is designed to contain the seed to be sown.

In the present embodiment of the invention, I have shown it applied to a simple planter, having a main supporting-wheel B, on the shaft whereof, is a crank $b$, connected by a suitable pitman $b^2$, to the moving parts of the planter. The bottom of the hopper is provided with a discharge-opening $a$, placed at about the center thereof, and above this discharge-opening and arranged to move back and forth above the same, is a slide C, provided with openings $c, c,$ the openings being of such size as to form receptacles for the exact quantity of seed to be deposited at each operation of the planter. Projecting from the slide C is a bar $c^2$, attached to the slide by a socket $c^3$, and to the bar $c^2$ is attached the pitman $b^2$, so that, as the planter is moved along, the slide is given a reciprocating motion. The length of the crank is such, that the slide is given a movement in each direction, equal to the distance which the center of each opening $c,$ is situated from the center of the slide, so that, at the extreme limit of each movement of the slide, either one opening or the other is brought to register with the opening $a$ in the bottom of the hopper.

Projecting from the slide and serving to retain the same in place, and also to even off the charge of seed carried by the receptacles as they approach the discharge-opening $a$, is a board or plate D attached to the bottom of the hopper. Mounted on this board, is a cylinder $d$ containing a plunger $D^2$ which is retained in a normal elevated position by a spring $d^2$.

E, E, represent bell-crank-levers mounted on cross-bars $e$ extending across the hopper and forming a fulcrum for the levers. The inner ends of each of the levers rests in a socket $d^3$, formed in the upper end of the plunger $D^2$, so that, as the inner ends of the levers are depressed, the plunger is forced downward, and, as it is located immediately above the opening, $a$, in the bottom of the hopper, it will, when one of the openings $c$ in the slide registers with the opening $a$ cause the discharge of the seed contained in the receptacle $c$, and through the openings $a$.

The slide is provided with two projections $c^4$, $c^4$, so arranged that, as the slide is moved to bring one of the openings $c$ to register with the opening in the bottom of the hopper, the projections will strike one or the other end $e^2$ of the levers E.

F represents a drill-tooth, suitably connected with the frame of the machine, and arranged to receive the seed through the opening $a$ in the bottom of the hopper, and assist in planting the seed in the usual way.

From the foregoing, it will be clear, that by my construction, I provide a simple, inexpensive, and easily-operated device, and one which is not likely to get out of order, or in which there is any possibility of the seed becoming clogged, the movements being absolutely positive, and, in no way, does the discharge of the seed depend upon other than simple and direct mechanical movements.

Having thus fully described my invention, what I claim as new, and desire to secure by Letters Patent, is—

1. A planter, comprising a hopper having a discharge-opening, a reciprocating slide having receptacles therein, and provided with abutments thereon, a plunger arranged above the discharge opening, and pivoted levers bearing on the plunger and arranged in the path of movement of the abutments, substantially as described.

2. A planter comprising a hopper having a discharge-opening, a slide having abutments thereon and receptacles therein, and capable of reciprocating to bring the receptacles to register with the discharge-opening in the hopper, a bar or plate overlapping the slide whereby the same is retained in position, and the quantity of seed carried by the receptacles is regulated, a plunger arranged above the discharge opening, and pivoted levers bearing on the plungers and arranged in the path of movement of the abutments on the slide, substantially as described.

3. A planter comprising a hopper, having a discharge-opening, a slide having abutments thereon and receptacles therein, and capable of reciprocating to bring the receptacles to register with the discharge-opening in the hopper, a bar or plate overlapping the slide whereby the same is retained in position, and the quantity of seed carried by the receptacles is regulated, and a plunger arranged above the discharge-opening, pivoted levers for depressing the plunger, arranged in the path of movement of the abutments on the slide and a spring whereby the plunger is retained in a normal raised position, substantially as described.

4. A planter comprising a hopper having a discharge opening, a slide having receptacles and capable of reciprocating to bring the receptacle in line with the discharge opening, a bar overlapping the slide, whereby the same is retained in position and the quantity of seed carried by the receptacle regulated, a reciprocating plunger arranged above the discharge opening, pivoted levers arranged adjacent to the plunger, projections on the slide engaging the levers, a crank on the supporting wheel-shaft, and a pitman connecting the crank to the slide, substantially as described.

5. A planter comprising a hopper having a discharge opening, a slide having receptacles and capable of reciprocating to bring the receptacles in line with the discharge opening, a reciprocating plunger arranged above the discharge opening, pivoted levers arranged adjacent to the plunger, projections on the slide engaging the levers, a crank on the supporting wheel-shaft, and a pitman connecting the shaft to the slide, substantially as described.

6. A planter comprising a hopper having a discharge opening, a slide having receptacles and capable of reciprocating, a plunger arranged above the discharge opening, levers for depressing the plunger, and a spring, whereby the plunger is retained in a normal and raised position, a crank on the supporting wheel-shaft, and a pitman connecting the crank to the slide, substantially as described.

7. A planter comprising a hopper having a discharge opening, a slide having receptacles and capable of reciprocating to bring the receptacles in line with the discharge opening, a bar or plate overlapping the slide whereby the same is retained in position, and the quantity of seed carried by the receptacles regulated, a plunger arranged above the discharge opening, levers for depressing the plunger, and a spring, whereby the plunger is retained in a normal and raised position, a crank on the supporting wheel-shaft, and a pitman connecting the crank to the slide, substantially as described.

In testimony whereof I affix my signature in presence of two witnesses.

ISRAEL Y. PALMER.

Witnesses:
J. H. HOOTEN,
S. P. KIRKLAND.